United States Patent [19]
Chung

[11] Patent Number: 5,834,050
[45] Date of Patent: *Nov. 10, 1998

[54] BAKING MIX INCLUDING NOVEL LEAVENING ACID COMPOSITION PRODUCED BY HEATING MONOCALCIUM PHOSPHATE AT ELEVATED TEMPERATURES

[75] Inventor: Frank H. Y. Chung, Langhorne, Pa.

[73] Assignee: Rhodia Inc., Cranbury, N.J.

[ * ] Notice: The term of this patent shall not extend beyond the expiration date of Pat. No. 5,544,044.

[21] Appl. No.: 895,198

[22] Filed: Jul. 16, 1997

Related U.S. Application Data

[62] Division of Ser. No. 649,397, May 17, 1996, Pat. No. 5,667,836, which is a division of Ser. No. 344,322, Nov. 22, 1994, Pat. No. 5,554,404.

[51] Int. Cl.$^6$ ....................................................... A21D 2/02
[52] U.S. Cl. ........................... 426/555; 426/465; 426/472; 426/520; 426/551; 426/561; 426/563
[58] Field of Search ...................................... 426/551, 520, 426/563, 561, 465, 472, 555

[56] References Cited

U.S. PATENT DOCUMENTS 5,667,836  9/1997  Chung ...................................... 426/563

Primary Examiner—Helen Pratt
Attorney, Agent, or Firm—Andrew M. Solomon

[57] ABSTRACT

A baking mix for preparing an edible baked good including a leavening acid comprising the product produced by heating monocalcium phosphate at an elevated temperature for a suitable period of time so that the weight of the resulting leavening acid composition is between 83 to 93 percent of the weight prior to heating is provided.

3 Claims, 1 Drawing Sheet

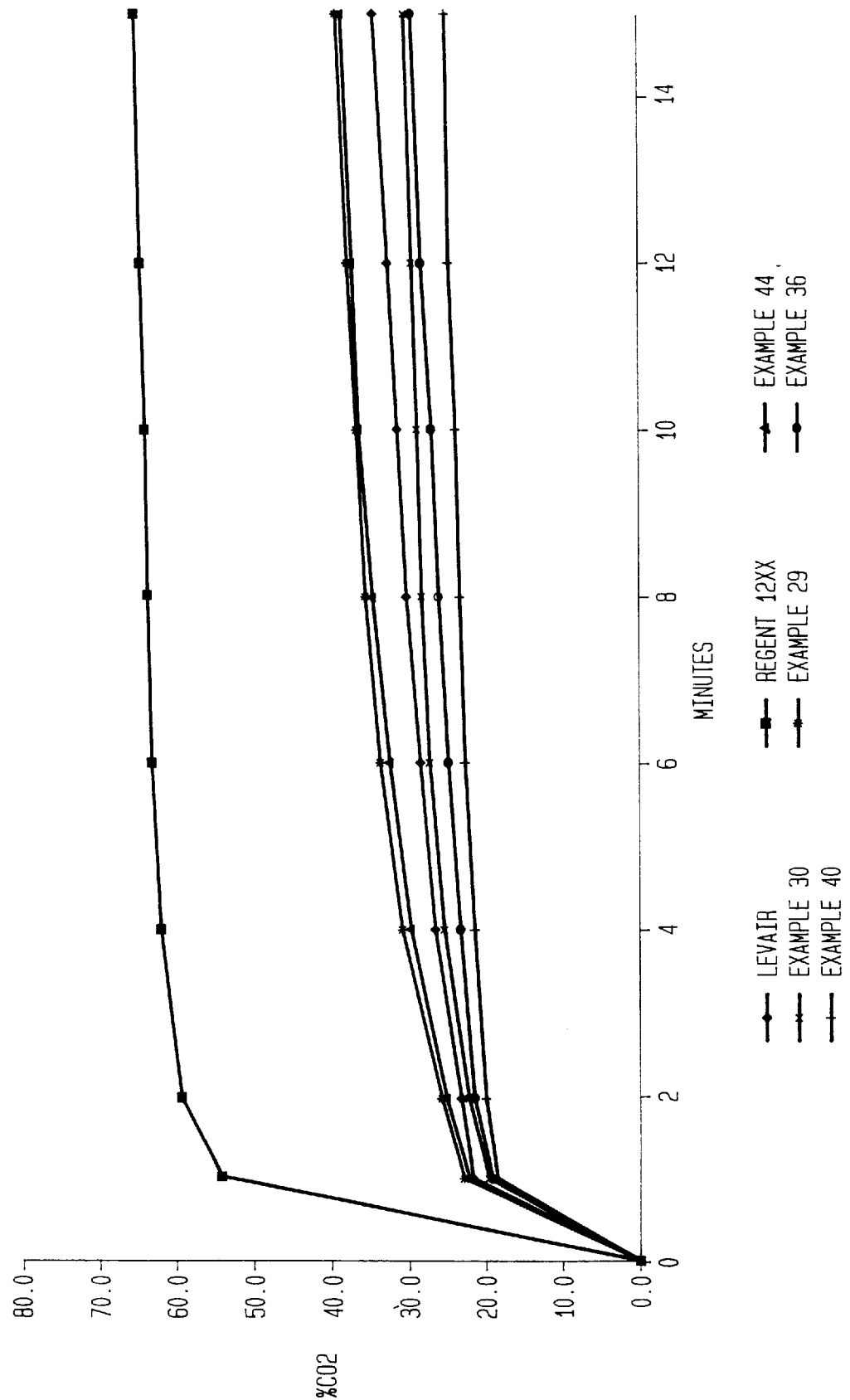

BAKING MIX INCLUDING NOVEL LEAVENING ACID COMPOSITION PRODUCED BY HEATING MONOCALCIUM PHOSPHATE AT ELEVATED TEMPERATURES

This application is a division of application Ser. No. 08/649,397, filed on May 17, 1996, now U.S. Pat. No. 5,667,836, which is a division of application Ser. No. 08/344,322, filed on Nov. 22, 1994, now U.S. Pat. No. 5,554,404.

BACKGROUND OF THE INVENTION

1. Field of the Invention

The present invention relates to leavening acid compositions for baked goods and more particularly monocalcium phosphate leavening acids which have excellent control release properties.

2. Technology Description

Chemical leavening systems have been known for over 100 years. The replacement of yeast to induce the process of fermentation by a carbonate alkali which is subjected to the neutralizing action of an acid has reduced the amount of time and materials required for the preparation of baked goods. From this early beginning various leavening systems have been invented and sold as baking powders which contain not only the leavening alkali and the acid employed to neutralize the acid, but also fillers which enabled convenient measurement, handling and storage of such baking powders.

Leavening systems have long been known to comprise two basic ingredients. The first, of course, is the leavening acid such as cream-of-tartar, various phosphoric acids such as orthophosphoric acid, pyrophosphoric acid and the partial salts thereof such as monocalcium phosphate, sodium acid pyrophosphate, and any other suitable, edible, non-toxic acid which would not impart an undesirable taste to the resultant baked goods. Such acids have been known as "acidulants", or "baking acids" but more commonly as "leavening acids".

When added to a moist batter or dough, the acid reacts with a carbon dioxide liberating compound included in the batter or dough to yield the gas necessary for leavening. The rate of gas evolution is an important consideration determining largely the volume, density and texture qualities which will be imparted to the final baked product. This rate must occur within rather narrow limits for some applications such as in the preparation of prepared, canned dough for biscuits. Also, leavening requirements differ widely among the various baked goods for each of these demands a particular speed of evolution to ensure highest quality products. One of the principal factors with respect to the speed of evolution of carbon dioxide is the reactivity of the carbon dioxide producing material.

It is a primary objective when using leavening acids to modulate and control the carbon dioxide liberation kinetics to yield a suitable final baked good product. More particularly, it is desirable to limit the reactive effect of water with the leavening acid. Ideally, the leavening acid would be designed so that it would not be reactive at the time of kneading or cold storing of the dough but would be reactive during heating, where the leavening of the final product takes place.

Particularly useful leavening acids are phosphate materials, and more specifically monocalcium phosphate. This acid is considered desirable as a commercial candidate as it does not possess sodium and has no aftertaste. While monocalcium phosphate does not possess sodium it has been difficult to adequately control its reaction rate which results in the release of carbon dioxide bases at various stages during the baking cycle. The fundamental problem with the use of monocalcium phosphate is that it liberates gas at too fast a desired rate. As a result, its commercial use has generally been limited to being a part of a leavening acid blend. Such blends can be less than optimal because they either may contain sodium, for example blends of monocalcium phosphate with sodium aluminum phosphate or sodium pyrophosphate, or may not have a completely bland taste.

It has been known to regulate the speed of carbon dioxide evolution by control of the reactivity of the leavening acid. Numerous attempts to control the speed of reaction of the leavening acid are known in the art. Typical examples include U.S. Pat. No. 3,034,899 to Tucker wherein a finely divided calcium salt is combined with the acid to control the speed of reaction.

Calcium salts have been employed in chemical leavening systems from its earliest days. A typical example of such use is found in U.S. Pat. No. 315,831 to Peters. However, such calcium salts as taught in Peters are relatively slow acting and have not provided satisfactory performance as the carbonate factor particularly in comparison with the alkali metal salts. Although calcium salts such as calcium carbonate have been employed for various purposes such as preservatives for the leavening acid, etc. as noted in U.S. Pat. Nos. 4,388,336 and 4,526,801, such carbonates do not provide the reactivity desired for a carbonate factor in baked goods. The use of so-called "coated" monocalcium phosphate here the monocalcium phosphate has a thin coating of phosphate surrounding its acid core is known in the art. However, the "coating" does not provide the reaction kinetics that is ideally preferred and typically can only be used as part of a blend composition. Such materials are disclosed in U.S. Pat. No. 2,160,232. To produce the coated materials, the starting monocalcium phosphate material is subjected to heat treatment at a temperature above about 140° C. The reference further states that the materials should not be heated to above 230° C. as it is alleged that this can cause rapid conversion of leavening acid to a pyrophosphate form. The reference further suggests that the neutralizing value, i.e., the amount of sodium bicarbonate which is completely neutralized by 100 parts by weight of the acid phosphate, of the acids so produced is between about 83 and 88. While this technology has improved the controlled reactivity of the monocalcium phosphate its performance is inferior as compared to sodium containing leavening acids such as sodium acid pyrophosphate and sodium aluminum phosphate.

U.S. Pat. No. 2,160,700 discloses that anhydrous monocalcium phosphate can be prepared by crystallization from an acid solution. A preferred method of preparing crystalline anhydrous monocalcium phosphate is also disclosed in this patent. In the method, a slight excess of lime is added to a relatively concentrated phosphoric acid solution to spontaneously produce a reaction temperature in excess of 140° C. The temperature is controlled in a range above 140° C. but below a temperature at which substantial amounts of pyrophosphate form. The temperature is usually controlled by the rate of lime addition. The reaction is continued until a substantially dry mass of solid anhydrous monocalcium phosphate is produced.

U.S. Pat. No. 3,109,738 is directed to a leavening acid composition which is a mixture of sodium aluminum phosphate and anhydrous monocalcium phosphate. This composition demonstrates excellent release properties but requires the use of a sodium containing acid.

U.S. Pat. No. 3,954,939 is directed to a monocalcium phosphate having reduced caking tendencies by admixing water with a monocalcium phosphate composition having a loss on ignition between about 14 and about 17%, permitting the water and monocalcium phosphate to remain in contact for a sufficient length of time to form a hydrated monocalcium phosphate composition with a loss on ignition between 17 and 21.5%, and drying the monocalcium phosphate composition to a free moisture content below 1% and preferably below about 0.5 if the admixture has a free moisture content above this level.

Accordingly, it would be desirable to produce a monocalcium phosphate leavening acid whose release rate properties can be tightly controlled for optimal use for a multiple of baking applications.

BRIEF SUMMARY OF THE INVENTION

In accordance with the present invention, leavening acid compositions which have excellent controlled release properties for reaction with leavening bases during various stages in the baking of baked goods are provided. The acid compositions are particularly characterized by being monocalcium phosphate compositions which have been synthesized to provide a specifically desired neutralizing value.

One embodiment of the present invention comprises a composition of matter comprising a monocalcium phosphate leavening acid having a neutralizing value of between about 44 and about 63 wherein the neutralizing value is the amount by weight of sodium bicarbonate needed to neutralize 100 parts by weight of said monocalcium phosphate leavening acid.

In specific embodiments, the monocalcium phosphate may be used in its anhydrous or monohydrate form.

To produce the inventive monocalcium phosphate of the present invention, a sample of monocalcium phosphate is heated to an elevated temperature for a period of time suitable to yield a material having a neutralization value of between 44 and 63. This typically is accomplished by heating 100 parts of monocalcium phosphate to between about 200° C. and about 310° C. for between about 0.25 hours and about 30 hours to yield 83 to 93 parts of resulting material.

Another embodiment of the present invention comprises a baking mix or preparing an edible baked good including a composition of matter comprising a monocalcium phosphate leavening acid having a neutralizing value of between about 44 and about 63 wherein the neutralizing value is the amount by weight of sodium bicarbonate needed to neutralize 100 parts by weight of said monocalcium phosphate leavening acid.

The baking mix may be used to prepare a cake, muffin, doughnut, bread, pastry, cookie, brownie, hush puppy, pancake, waffle, pizza crust or roll.

Accordingly, it is an object of the present invention to provide a composition useful as a leavening acid which has excellent stability and release properties.

It is another object of the present invention to provide a process for producing the novel leavening acid composition.

It is yet another object of the present invention to provide a baking mix using the novel leavening acid composition.

These, and other objects will readily be apparent to those skilled in the art as reference is made to the detailed description of the preferred embodiment.

BRIEF DESCRIPTION OF THE DRAWING

The DRAWING is a graph of the Dough Rate of Reaction (DRR) of monocalcium phosphate heated to different temperatures for defined periods of time in accordance with the present invention as compared to an unheated sample and to a commercially successful sodium aluminum phosphate leavening acid.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The main focus of the present invention is to develop leavening acid compounds which have desirable control release properties so that the acid would be released only when the proper time in the baking cycle takes place. More particularly, the liberation of carbon dioxide should take place either by an input of water to a baking mixture containing the leavening acid compound, by the elevation of temperature during heating or by the combined effect. Conversely, it is desired that the acid not prematurely release carbon dioxide gas during the preparation of the baking mix, or subsequent dough, for example, during the kneading phase, or while it is being stored prior to baking. The present invention accomplishes the above criteria by treating a monocalcium phosphate leavening acid composition such that its neutralizing value is reduced to between about 44 and about 63. Particularly preferred compositions have a neutralizing value between about 44 and about 57, even more preferred between about 46 and about 55.

The leavening acid which forms the present invention can be any of the following materials: monocalcium phosphate, monohydrate; and monocalcium phosphate, anhydrous. Particularly preferred is the use of monocalcium phosphate in its hydrated form.

The monocalcium phosphate typically has a mean particle size of between about 20 and about 200 microns, with particle sizes ranging from about 30 to about 120 microns or from about 50 to about 200 microns being commercially available.

Before the heat treatment of the present invention, the neutralizing value of the monocalcium phosphate is typically about 80–85. To reduce the neutralizing value to where the monocalcium phosphate leavening acid can be used by itself as a multifunctional leavening acid it is simply heated for a period of time until its neutralizing value ranges between about 44 and 63.

The heating step is simply accomplished by using any heat means known in the art such as using an oven, steam, either tossed air or convection type, a hot plate, fluidized bed rotary drum dryer and the like. To determine when the monocalcium phosphate has the desired neutralizing value can be accomplished by measuring the amount of material lost upon heating. In practice, to obtain a composition having a neutralizing value of between 44 and 63, it is heated until it mass weighs between 83 and about 93 percent of its starting mass (i.e., the loss on drying (LOD) is between about 7 and about 7 percent). Even more referred is heating to where the final amount of material produced weighs between about 83 to about 89 percent of its starting mass (the LOD is between 11 and 17). Outstanding material is obtained when the final amount of material produced weighs between about 85 to about 86.5 percent of its starting mass (the LOD is between 3.5 and 15).

Heating conditions used generally involve the heating of the monocalcium phosphate starting material so that the material temperature reaches between about 200° C. to about 310° C. and the material is held at that temperature for a time period of between about 0.25 hours to about 30 hours. The heating temperature and time are selected to obtain the above-recommended LOD values. For example, when the temperature of the monocalcium phosphate is heated to about 220° C., the time of heating is between about 20 and about 30 hours; when the temperature of the monocalcium phosphate is heated to about 250° C., the time of heating is between about 2 and about 5 hours; when the temperature of the monocalcium phosphate is heated to about 270° C., the time of heating is between about 1 and about 2 hours; when the temperature of the monocalcium phosphate is heated to about 290° C., the time of heating is between about 0.75 and about 1.50 hours; and when the temperature of the monocalcium phosphate is heated to about 310° C., the time of heating is between about 0.50 and about 0.75 hours.

After the monocalcium phosphate has been heated for the suitable amount of time, it is cooled and stored under conditions so that the material does not absorb moisture. Particularly preferred storage conditions include watertight packaging or storage in the presence of a desiccant.

Once produced, the novel leavening acid compositions of the present invention may be incorporated in baking mixes for food products where the acids react with bases, typically sodium bicarbonate, to produce the leavening function that any known chemical leavening agent or biological leavener such as yeast would ordinarily provide. The inventive chemical leavening system of this invention may be incorporated into a baking powder product conveniently prepared by admixing the acid with an base as a dry powder mix. It is well known that baking powders in the dry powder form are best prepared together with fillers contributing to the bulk of the powder and aiding its measurement for actual use. Fillers such as starch, calcium sulfate or calcium carbonate are generally employed in baking powders of this invention. Conventional preservatives and fillers may be employed together with the baking powder composition of this invention as is known in the art.

Examples of food products which can incorporate the inventive compositions, include, but are not limited to the following: cake, including layer and pound cake; muffin; doughnut; bread; pastry; cookie; room temperature, refrigerated or frozen dough; brownie; hush puppy; pancake; waffle; pizza crust or roll. The food products may be stored at room temperature or at reduced temperatures, e.g., refrigerated or frozen storage conditions.

In use, when the baking mixes are heated, the leavening acids, which typically comprise between about 0.2 to about 4.0 percent by weight of the mix, controllably release and react with the bases to produce a properly leavened food product. The use of the inventive monocalcium phosphate material provides a control release profile such that a particularly high quality leavened product is produced. The present invention enables the use of monocalcium phosphate alone as a leavening acid. This is a significant improvement as it contains no sodium, has a bland taste and reacts slowly enough to provided desired leavening properties.

Fresh dough can be prepared from the leavening systems of this invention in the conventional manner as has been practiced in the art. Typically the ingredients are mixed together in the dry state and may se stored for conventional time periods. It is preferable to refrigerate dry mixed materials if extended time periods occur between mixing and the preparation of the fresh dough. The dry mix is employed to prepare fresh dough by incorporating suitable liquids such as milk and shortening materials as is known in the art.

As known in the art, the desired pH of the final baked goon can be controlled by incorporating into fresh dough leavening acid and alkaline carbonate sources normally employed for that purpose in the art. Generally, the pH of the final baked product ranges from about 5.5 to about 9.0, preferably from about 6.9 to about 7.5. The amount of alkaline carbonate material added should be sufficient to provide a pH within the above-described ranges. Typically there is included from about 0.3% by weight to about 3% by weight of the edible, alkaline agent, based upon the weight of the powdered ingredients employed.

The invention will be better understood by reference to the following examples.

EXAMPLE 1

20 parts of monocalcium phosphate, monohydrate form (MCP), is weighed accurately into a large, flat porcelain casserole dish and placed in a gravity convection oven. The oven is heated so that the temperature of the material in the oven reaches 200° C. and the material is held at this temperature for 0.25 hours.

The neutralizing value of this material is measured by determining how many parts by weight of sodium bicarbonate are needed to neutralize 100 parts of this composition. This value is shown in Table 1. The neutralizing value for untreated MCP (Regent 12XX) is 80 and for Levair, a commercially available sodium aluminum phosphate widely recognized for its excellent control release properties is 100.

The loss on drying (% LOD) is measured by weighing the resulting material and determining the percent of material lost by the heating process as compared to the initial amount used. This value is listed in Table 1.

The dough rate of reaction (DRR) is a term that defines the speed of carbon dioxide evolved during mixing and holding of a dough prior to baking. It is determined by measuring the volume of carbon dioxide evolved from a standard dough formulation containing known quantities of leavening acid and baking soda under a constant temperature of 27° C. in a modified Chittick Apparatus. The DRR is often used as a guide for selecting the type of leavening acid that is best suited for a particular product application. A low value for the DRR, i.e., less than 50 over 2, 6 and/or 10 to 15 minute reaction times, tends to indicate an excellent controlled reaction rate.

To measure the amount of $CO_2$ liberated upon reaction with sodium hydrogen carbonate or the Example 1 composition, 73.5 parts of a simulated dry dough mix containing flour, nonfat dry milk, salt and shortening, 0.75 carts of $NaHCO_3$ and 0.93 parts of the Example 1 composition are added to a reaction bomb. 43 parts of water are added and the contents are mixed. Using a modified Chittick Apparatus (or any similar apparatus which capable of measuring gas evolution) the amount of $CO_2$ evolved compared to the total amount available to be evolved (DRR) is measured at times of 1, 2, 4, 6, 8, 10, 12 and 15 minutes. The DRR values are listed in Table 2, as are the DRR values or Regent 12XX and Levair.

To determine if the above Example leavening acid composition would work well in baking mixes, the following yellow cake mix is prepared:

| | |
|---|---|
| Cake Flour | 236.00 parts |
| Granulated Sugar | 280.84 parts |
| Shortening | 53.57 parts |
| Nonfat Dry Milk | 18.17 parts |
| Egg Yolk Solids | 22.89 parts |
| Egg White Solids | 9.20 parts |
| NaCl | 6.37 parts |
| Inventive Leavening Acid Composition | 9.0–13.0 parts |
| Sodium Bicarbonate | 5.66 parts |
| Pregelatinized Wheat Starch | 2.60 parts |
| Emulsifier | 5.00 parts |

A batter is made by adding to the mixture first, 170.00 parts of water, then 142.00 parts of water. The batter was immediately added to a baking dish and baked at 375° F. for 25 minutes to form a yellow cake.

To determine if the above batters could produce high quality cakes after baking, they were quantitatively analyzed by using the following criteria: Batter Specific Gravity, Cake Specific Volume and Cake pH. A specific volume of 3.25 is considered commercially acceptable. The values for these criteria are shown in Table 1.

As a first comparison, the cake specific volume measured for the Regent 12XX cake is 2.59 and the cake specific volume measured for the Levair cake is 3.55.

EXAMPLES 2–47

The procedure of Example 1 is repeated except that the heating condition (temperature and time) used are shown in Table 1, and for Example 20–23 and 34–47, 100 parts of monocalcium phosphate monohydrate starting material are used. Also shown in Table 1 are the values for % Loss on Drying (% LOD), Neutralizing Value (NV), Batter Specific Gravity (Sp. Gravity), Cake Specific Volume (Sp. Volume) and Cake pH (pH).

The DRR data for Examples 2–19 and 24–33 are shown in Table 2.

TABLE 1

| Example | Temp (°C.) | Time (hr) | % LOD | NV | Sp. volume | Sp. Gravity | pH |
|---|---|---|---|---|---|---|---|
| Levair | — | — | — | 100 | 3.55 | 0.92 | 7.79 |
| Regent 12XX | — | — | — | 78 | 2.59 | 0.86 | 7.34 |
| 1 | 200 | 0.25 | 7.6 | 67 | 2.67 | 0.85 | 7.21 |
| 2 | 200 | 0.50 | 8.0 | 66 | 2.74 | 0.55 | 7.16 |
| 3 | 200 | 1.00 | 8.2 | 65 | 2.75 | 0.87 | 7.19 |
| 4 | 200 | 1.50 | 8.3 | 66 | 2.80 | 0.85 | 7.16 |
| 5 | 200 | 2.00 | 8.3 | 67 | 3.11 | 0.77 | 7.12 |
| 6 | 200 | 3.00 | 8.4 | 67 | 3.18 | 0.77 | 7.16 |
| 7 | 200 | 7.00 | 5.6 | 66 | 3.18 | 0.74 | 7.09 |
| 8 | 200 | 17.00 | 9.0 | 65 | 3.18 | 0.75 | 7.07 |
| 9 | 200 | 20.00 | 9.0 | 65 | 3.27 | 0.74 | 7.07 |
| 10 | 220 | 0.25 | 7.5 | 67 | 2.64 | 0.83 | 7.13 |
| 11 | 220 | 0.50 | 8.3 | 66 | 2.73 | 0.83 | 7.17 |
| 12 | 220 | 1.00 | 5.7 | 65 | 2.55 | 0.51 | 7.14 |
| 13 | 220 | 1.50 | 5.8 | 66 | 3.06 | 0.79 | 7.12 |
| 14 | 220 | 2.00 | 8.9 | 65 | 3.05 | 0.78 | 7.12 |
| 15 | 220 | 3.00 | 9.3 | 63 | 3.29 | 0.75 | 7.15 |
| 16 | 220 | 5.00 | 9.5 | 62 | 3.31 | 0.76 | 7.13 |
| 17 | 220 | 7.00 | 9.9 | 62 | 3.31 | 0.76 | 7.18 |
| 18 | 220 | 17.00 | 10.9 | 59 | 3.42 | 0.78 | 7.32 |
| 19 | 220 | 20.00 | 11.2 | 58 | 3.46 | 0.80 | 7.33 |
| 20 | 220 | 22.00 | 12.9 | 54 | 3.29 | 0.87 | 7.51 |
| 21 | 220 | 24.00 | 13.0 | 53 | 3.37 | 0.89 | 7.49 |
| 22 | 220 | 26.00 | 13.1 | 51 | 3.46 | 0.91 | 7.50 |
| 23 | 220 | 28.00 | 13.3 | 52 | 3.41 | 0.90 | 7.50 |
| 24 | 250 | 0.25 | 7.6 | 65 | 3.00 | 0.82 | 7.21 |
| 25 | 250 | 0.50 | 10.3 | 61 | 3.29 | 0.76 | 7.29 |
| 26 | 250 | 1.00 | 11.3 | 59 | 3.36 | 0.79 | 7.41 |
| 27 | 250 | 1.50 | 13.9 | 56 | 3.49 | 0.81 | 7.61 |
| 25 | 250 | 2.00 | 13.3 | 54 | 3.57 | 0.37 | 7.50 |
| 29 | 250 | 3.00 | 13.6 | 53 | 3.50 | 0.90 | 7.54 |
| 30 | 250 | 5.00 | 14.1 | 51 | 3.53 | 0.98 | 7.75 |
| 31 | 250 | 7.00 | 14.7 | 51 | 3.45 | 0.91 | 7.78 |
| 32 | 250 | 17.00 | 14.9 | 50 | 3.51 | 0.96 | 8.99 |
| 33 | 250 | 20.00 | 15.5 | 48 | 3.37 | 0.98 | 8.65 |
| 34 | 270 | 0.50 | 9.8 | 59 | 3.11 | 0.80 | 7.09 |
| 35 | 270 | 1.00 | 13.9 | 50 | 3.53 | 0.85 | 7.15 |
| 36 | 270 | 1.50 | 14.6 | 46 | 3.62 | 0.92 | 7.10 |
| 37 | 270 | 2.00 | 15.1 | 44 | 3.56 | 0.92 | 7.15 |
| 38 | 290 | 0.50 | 11.0 | 63 | 3.32 | 0.80 | 7.37 |
| 39 | 290 | 0.75 | 12.9 | 57 | 3.39 | 0.85 | 7.55 |
| 40 | 290 | 1.00 | 44.9 | 52 | 3.52 | 0.92 | 7.50 |
| 41 | 290 | 1.25 | 15.4 | 52 | 3.43 | 0.93 | 8.31 |
| 42 | 290 | 1.50 | 15.5 | 52 | 3.37 | 0.94 | 8.17 |
| 43 | 310 | 0.25 | 9.3 | 67 | 2.81 | 0.85 | 7.23 |
| 44 | 310 | 0.50 | 13.9 | 55 | 3.50 | 0.39 | 7.77 |
| 45 | 310 | 0.75 | 15.2 | 53 | 3.36 | 0.93 | 8.51 |
| 46 | 310 | 1.00 | 15.8 | 52 | 3.00 | 0.94 | 9.31 |
| 47 | 310 | 1.25 | 16.0 | 49 | 2.94 | 0.93 | 9.38 |

TABLE 2

DRR PROFILE OF EXAMPLE MATERIALS

| EXAMPLE | 1 min. | 2 min. | 4 min. | 6 min. | 8 min. | 10 min. | 12 min. | 15 min. |
|---|---|---|---|---|---|---|---|---|
| REGENT 12XX | 57.1 | 61.9 | 64.4 | 65.3 | 65.8 | 66.0 | 66.3 | 66.7 |
| LEVAIR | 21.6 | 23.7 | 26.5 | 28.3 | 29.9 | 31.5 | 32.7 | 34.5 |
| 1 | 61.3 | 65.6 | 67.9 | 69.0 | 69.7 | 70.2 | 70.6 | 71.1 |
| 2 | 57.0 | 62.0 | 64.2 | 65.4 | 66.1 | 66.3 | 66.5 | 67.0 |
| 3 | 48.5 | 59.5 | 63.8 | 65.4 | 66.1 | 66.8 | 67.2 | 67.7 |
| 4 | 48.1 | 57.9 | 61.5 | 62.9 | 63.6 | 63.8 | 63.8 | 64.0 |
| 5 | 43.5 | 56.0 | 61.5 | 63.1 | 63.8 | 64.2 | 64.5 | 64.7 |
| 6 | 38.3 | 51.5 | 58.3 | 59.9 | 60.8 | 61.5 | 62.0 | 62.2 |
| 7 | 36.5 | 50.3 | 59.2 | 61.1 | 62.0 | 62.4 | 62.9 | 63.3 |
| 8 | 30.5 | 44.2 | 54.9 | 57.9 | 59.2 | 59.9 | 60.6 | 61.1 |
| 9 | 30.5 | 44.2 | 55.1 | 58.3 | 59.7 | 60.1 | 60.8 | 61.5 |
| 10 | 59.8 | 65.3 | 67.6 | 68.8 | 69.5 | 69.7 | 70.0 | 70.2 |
| 11 | 40.0 | 54.3 | 61.4 | 63.7 | 64.9 | 65.8 | 66.3 | 66.7 |
| 12 | 32.7 | 47.4 | 58.4 | 61.2 | 62.4 | 63.0 | 63.5 | 64.4 |
| 13 | 30.1 | 44.9 | 56.8 | 60.3 | 61.7 | 62.6 | 63.0 | 63.7 |
| 14 | 30.1 | 44.4 | 55.9 | 58.4 | 59.8 | 60.7 | 61.2 | 61.7 |
| 15 | 28.1 | 41.4 | 55.7 | 59.8 | 61.4 | 62.6 | 63.3 | 64.0 |
| 16 | 27.2 | 39.8 | 53.6 | 58.0 | 59.8 | 60.7 | 61.7 | 62.4 |
| 17 | 26.5 | 38.4 | 53.2 | 57.5 | 59.8 | 61.0 | 61.7 | 62.6 |
| 18 | 24.4 | 33.4 | 45.8 | 50.2 | 52.0 | 53.2 | 53.8 | 54.8 |
| 19 | 24.9 | 33.1 | 44.6 | 48.8 | 50.6 | 51.8 | 52.5 | 53.6 |
| 24 | 31.3 | 45.4 | 57.1 | 66.1 | 61.5 | 62.4 | 63.1 | 63.8 |
| 25 | 29.0 | 40.1 | 50.5 | 53.5 | 55.1 | 56.0 | 56.7 | 57.4 |
| 26 | 24.9 | 33.2 | 44.2 | 48.4 | 50.2 | 51.4 | 52.1 | 53.0 |
| 27 | 24.0 | 28.8 | 37.6 | 41.7 | 44.0 | 45.6 | 46.5 | 47.9 |
| 28 | 21.7 | 25.3 | 31.3 | 34.1 | 36.4 | 37.8 | 38.7 | 40.1 |
| 29 | 20.7 | 23.5 | 28.1 | 30.4 | 32.3 | 33.4 | 34.3 | 35.5 |
| 30 | 19.8 | 21.9 | 25.1 | 26.7 | 27.8 | 28.5 | 29.0 | 29.9 |
| 31 | 17.9 | 19.8 | 21.6 | 22.5 | 23.5 | 24.4 | 24.9 | 25.5 |
| 32 | 18.4 | 19.8 | 21.4 | 22.5 | 23.4 | 23.9 | 24.1 | 24.8 |
| 33 | 17.9 | 18.8 | 19.8 | 20.2 | 21.1 | 21.6 | 22.1 | 22.3 |

Discussion of Data

The above data demonstrates that the monocalcium phosphate compositions which have been heat treated so that the neutralizing value for the resulting composition is between 44 and 63, and more preferably between 44 and 57 and yet most preferably between 46 and 55 yield leavening acids which have excellent control release properties while producing cakes that have a high specific volume. These neutralizing values correspond to a loss on drying of between about 7 and 17%, with a loss of between about 11 and 16% being particularly preferred. In nearly every example where the monocalcium phosphate is heated, the resulting properties exceed those of untreated monocalcium phosphate (Regent 12XX).

The data further demonstrates that it is the combination of heating temperature and heating time which should be monitored to yield satisfactory compositions. For example, particularly with respect to producing cakes having excellent specific volumes, at 220° C., excellent results are obtained when heating the monocalcium phosphate for between 20 and 28 hours (Examples 19–23); at 250° C., excellent results are obtained when heating the monocalcium phosphate for between 2 and 5 hours (Examples 28–30); at 270° C., excellent results are obtained when heating the monocalcium phosphate for between 1 and 2 hours (Examples 35–37); at 290° C., excellent results are obtained when heating the monocalcium phosphate for between 0.75 and 1.5 hours (Examples 39–42); and at 310° C., excellent results are obtained when heating the monocalcium phosphate for between 0.50 and 0.75 hours (Examples 44–45).

When compared to a commercially successful sodium aluminum phosphate, Levair, manufactured by Rhône-Poulenc Inc., under certain heating conditions, the inventive materials perform comparably without containing any sodium or aluminum. Referring to the Figure, the following inventive compositions yield control release profiles comparable to that of Levair: Example 29, Example 30, Example 36, Example 40 and Example 44. Each of these materials have a neutralizing value of between 46 and 55, with a loss on drying of between 13.6 and 14.9. As a reference, the control release profile of the untreated monocalcium phosphate, Regent 12XX, is shown. Its release properties are too rapid to be considered suitable for use alone in multiple leavening applications.

In short, the present invention produces a versatile leavening acid composition which is easy to produce, minimizes health risks, is bland to the taste and does not require blending with other leavening acid materials.

Having described the invention in detail and by reference to the preferred embodiments thereof, it will be apparent that modifications and variations are possible without departing from the scope of the appended claims.

What is claimed is:

1. A baking mix for preparing an edible baked good including a leavening acid composition comprising the product produced by heating monocalcium phosphate at an elevated temperature for a suitable period of time so that the weight of the resulting leavening acid composition is between 83 to 93 percent of the weight prior to heating.

2. The baking mix according to claim 1 which is used to produce a cake, muffin, doughnut, bread, pastry, cookie, room temperature, refrigerated or frozen dough, brownie, hush puppy, pancake, waffle, pizza crust or roll.

3. The baking mix according to claim 2 wherein said leavening acid composition comprises between about 0.2 to about 4.0 percent by weight of said mix.

* * * * *